(12) United States Patent
Huang

(10) Patent No.: US 6,494,327 B2
(45) Date of Patent: Dec. 17, 2002

(54) HANGER ASSEMBLY

(76) Inventor: May Huang, No. 81, Lane 530, Section 1, Chung Shan Road, Chang Hua City (TW)

( * ) Notice: Subject to any disclaimer, the term of this patent is extended or adjusted under 35 U.S.C. 154(b) by 0 days.

(21) Appl. No.: 09/854,796

(22) Filed: May 14, 2001

(65) Prior Publication Data

US 2002/0134742 A1 Sep. 26, 2002

(30) Foreign Application Priority Data

Mar. 20, 2001 (TW) ...................................... 90204335 U
Mar. 20, 2001 (TW) ...................................... 90204336 U

(51) Int. Cl.⁷ ................................................ A47F 5/00
(52) U.S. Cl. ........................ 211/17; 211/207; 211/107; 211/205; 211/111; 248/230.1; 248/295.11; 248/296.1
(58) Field of Search ................................ 211/107, 111, 211/205, 17, 86.01, 207; 248/230.1, 230.4, 230.5, 295.11, 296.1

(56) References Cited

U.S. PATENT DOCUMENTS

| | | | | |
|---|---|---|---|---|
| 1,509,022 A | * | 9/1924 | Noble | |
| 1,667,669 A | * | 4/1928 | Megee | |
| 1,975,303 A | * | 10/1934 | Walker et al. | |
| 2,243,517 A | * | 5/1941 | Adamson | |
| 3,333,808 A | * | 8/1967 | DuBoff | |
| 3,706,437 A | * | 12/1972 | Eberhardt | |
| 3,820,694 A | * | 6/1974 | Pabis | |
| 3,879,027 A | * | 4/1975 | Thurmond | |
| 5,044,505 A | * | 9/1991 | Spratt | |
| 5,294,006 A | * | 3/1994 | Deschino | |
| 5,400,991 A | * | 3/1995 | Werner | |
| 5,492,228 A | * | 2/1996 | Botkin | 211/207 X |

\* cited by examiner

Primary Examiner—Robert W. Gibson, Jr.
(74) Attorney, Agent, or Firm—Alan D. Kamrath; Rider, Bennett, Egan & Arundel

(57) ABSTRACT

A hanger assembly includes a vertical post, at least two fixing devices securely mounted to the vertical post at different levels, and at least two hanger members each of which is securely attached to an associated fixing device for supporting at least one object. The fixing devices are slidable along a vertical direction, thereby allowing adjustment in the levels of the fixing devices relative to the vertical post.

16 Claims, 9 Drawing Sheets

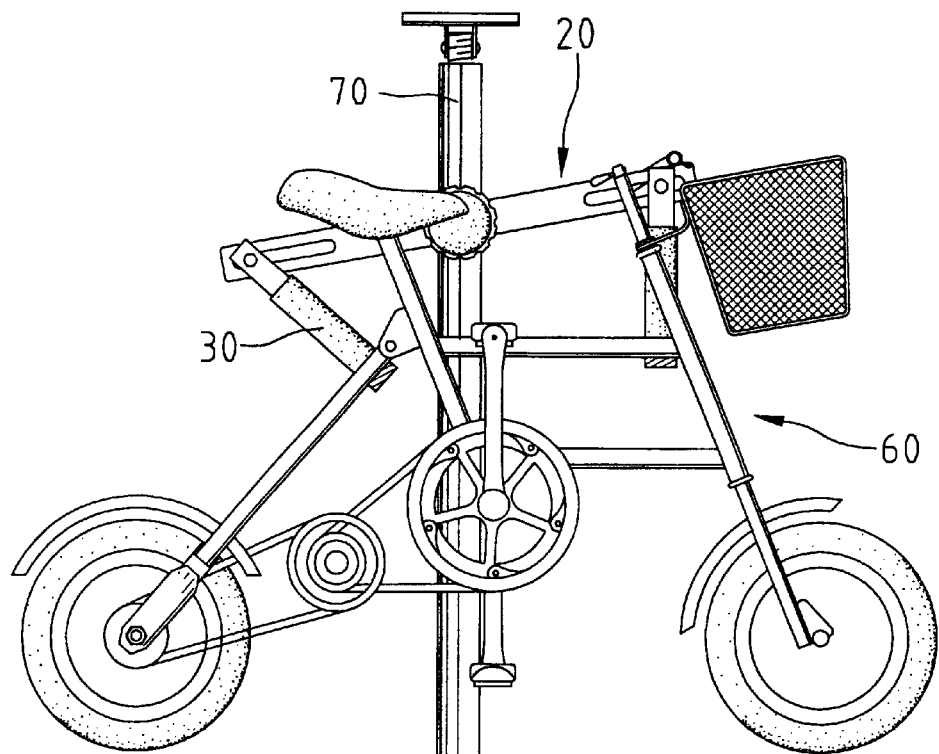
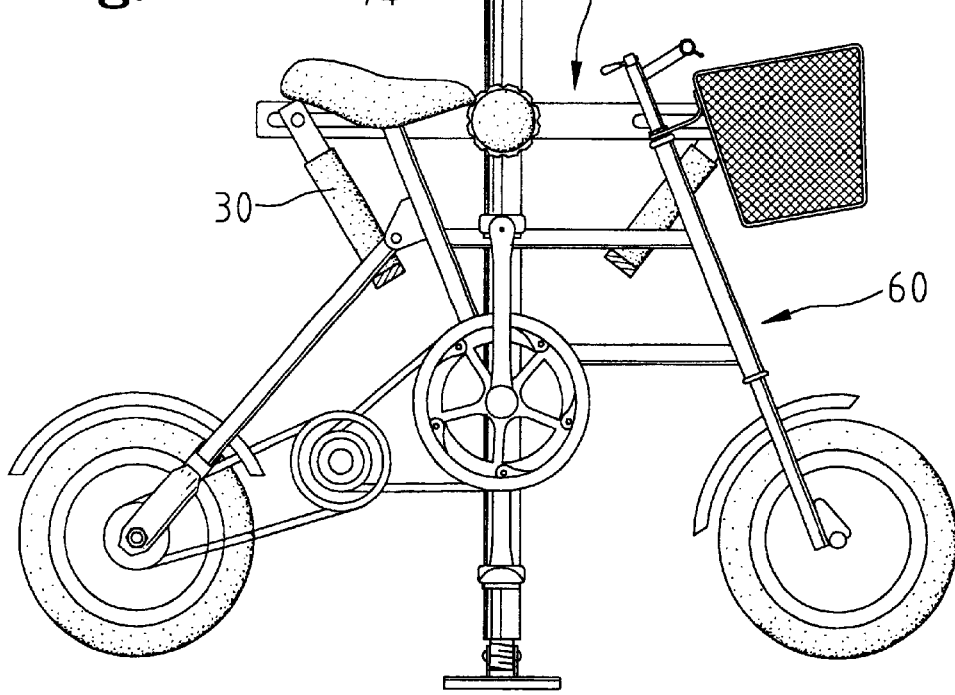
Fig. 4

HANGER ASSEMBLY

BACKGROUND OF THE INVENTION

1. Field of the Invention

The present invention relates to a hanger device that is slidably mounted to a vertical post for supporting objects. The present invention also relates to a hanger assembly including a vertical post and at least two hanger devices that are mounted to the vertical post at different levels, thereby saving space for storage of objects supported by the hanger devices.

2. Description of the Related Art

Space has become more and more precious in the modern world. A family may have more than one bicycle and their storage requires space. Some car owners have tires of various types for different uses, e.g., tires for snowing days, tires for raining days, and so-called "heat-melting tires" for high-speed driving. Deformation occurs, as the tires are piled up when not in use. The heat-melting tires may even stick with other tires under the action of gravity.

SUMMARY OF THE INVENTION

It is an object of the present invention to provide a hanger assembly including a vertical post and at least two hanger devices that are mounted to the vertical post at different levels, thereby saving for storage of objects (such as bicycles and tires) supported by the hanger devices.

In accordance with a first aspect of the invention, a hanger device comprises a fixing device securely mounted to a vertical post. The fixing device is slidable along a vertical direction, thereby allowing adjustment in a level of the fixing device relative to the vertical post. A hanger member is securely attached to the fixing device for supporting at least one object.

In accordance with a second aspect of the invention, a hanger assembly comprises a vertical post, at least two fixing devices securely mounted to the vertical post at different levels, and at least two hanger members each of which is securely attached to an associated fixing device for supporting at least one object. The fixing devices are slidable along a vertical direction, thereby allowing adjustment in the levels of the fixing devices relative to the vertical post.

The vertical post includes a lower tube and an upper tube that is telescopic with respect to the lower tube. In an embodiment of the invention, the hanger member includes two ends each having a slot. Two hooks are provided and each have an end slidably engaged with an associated slot. Each slot extends along a longitudinal direction of the hanger member. The end of each hook includes a hole. A bolt extends through each slot and the hole of an associated hook and then engages with a nut, thereby allowing adjustment of a longitudinal position of each hook relative to the hanger member. Each hook is also adjustable in an angular position relative to the hanger member. The hanger member can be used to hang a bicycle or a basket.

In another embodiment of the invention, the hanger member includes two opposite end faces each having a screw hole. A stop is attached to each end face and has a hole. Two knobs are provided and each includes a threaded stem extending through the hole of an associated stop and the screw hole of an associated end face. The hanger member can be used to hang a pair of tires.

The fixing device is preferably a quick release assembly. In an embodiment of the invention, the quick release assembly includes a C-shape tubular portion through which the vertical post extends. The tubular portion includes two opposite ends having a slit therebetween. A rod extends through the opposite ends of the tubular portion and has a threaded first end and a second end. A nut is engaged with the threaded first end of the rod. A lever includes a first end pivotally engaged with the second end of the rod and a second end for manual operation. The second end of the rod and the first end of the lever are so configured that the opposite ends of the tubular portion are moved toward each other to thereby securely clamp the vertical post when the lever is in a first position and that the opposite ends of the tubular portion are away from each other when the lever is in a second position to thereby allow the tubular portion to move along a vertical direction relative to the vertical post.

The tubular portion includes two mutually facing sickle-shape members each having a first end and a second end. The first ends of the sickle-shape members form the opposite ends of the tubular portion. A connecting member is interconnected between the second ends of the sickle-shape members. The second end of each sickle-shape member is pivotally connected to the connecting member. The connecting member includes a screw hole. The hanger member includes a hole. A knob includes a threaded stem that extends through the hole of the hanger member and the screw hole of the connecting member, thereby engaging the hanger member with the fixing device.

Other objects, advantages, and novel features of the invention will become more apparent from the following detailed description when taken in conjunction with the accompanying drawings.

BRIEF DESCRIPTION OF THE DRAWINGS

FIG. 4 is a side view illustrating use of a hanger assembly comprising a vertical post and two hanger devices in FIG. 1.

DETAILED DESCRIPTION OF THE PREFERRED EMBODIMENTS

Figure 1:
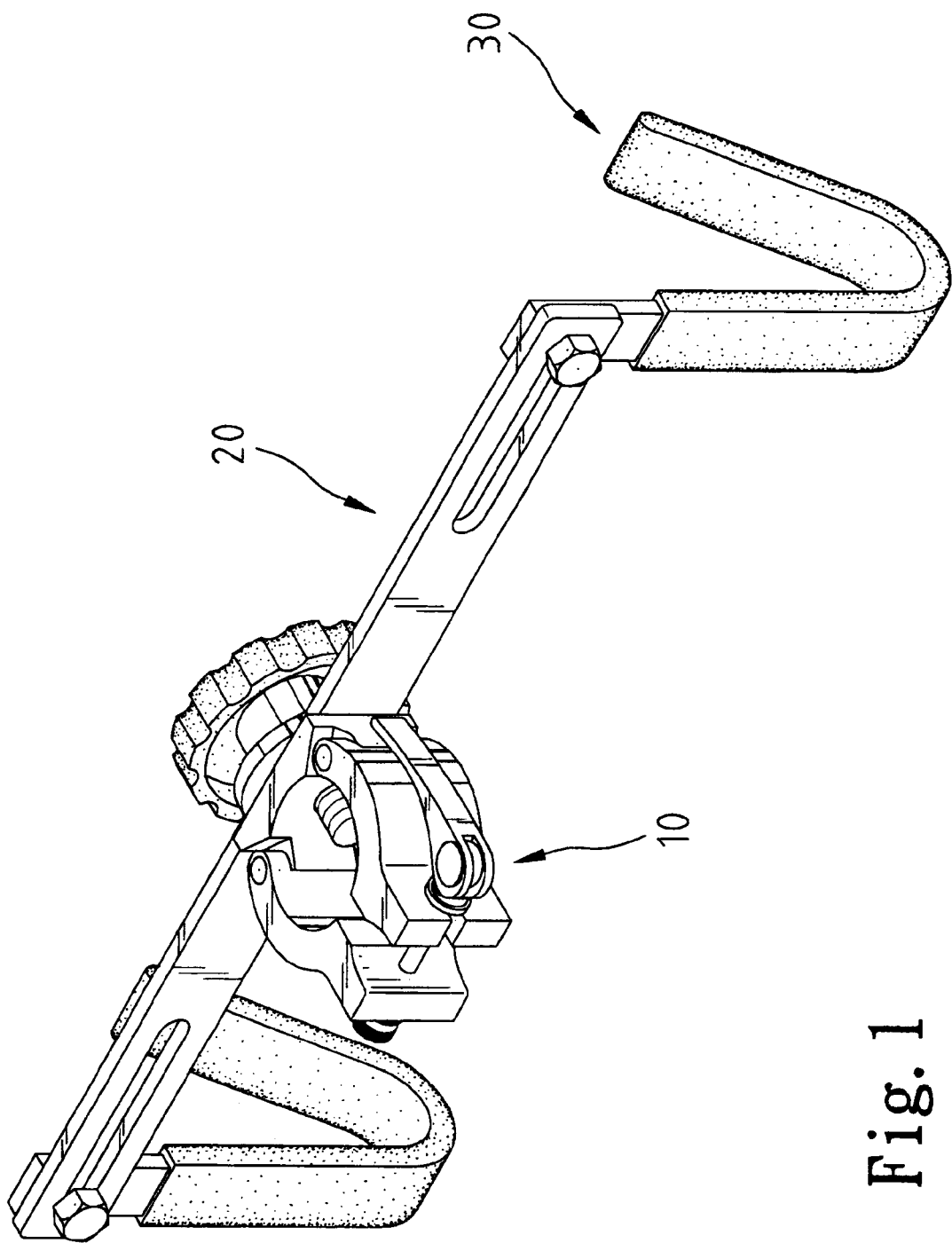
FIG. 1 is a perspective view of a first embodiment of a hanger device in accordance with the present invention.
Figure 2:
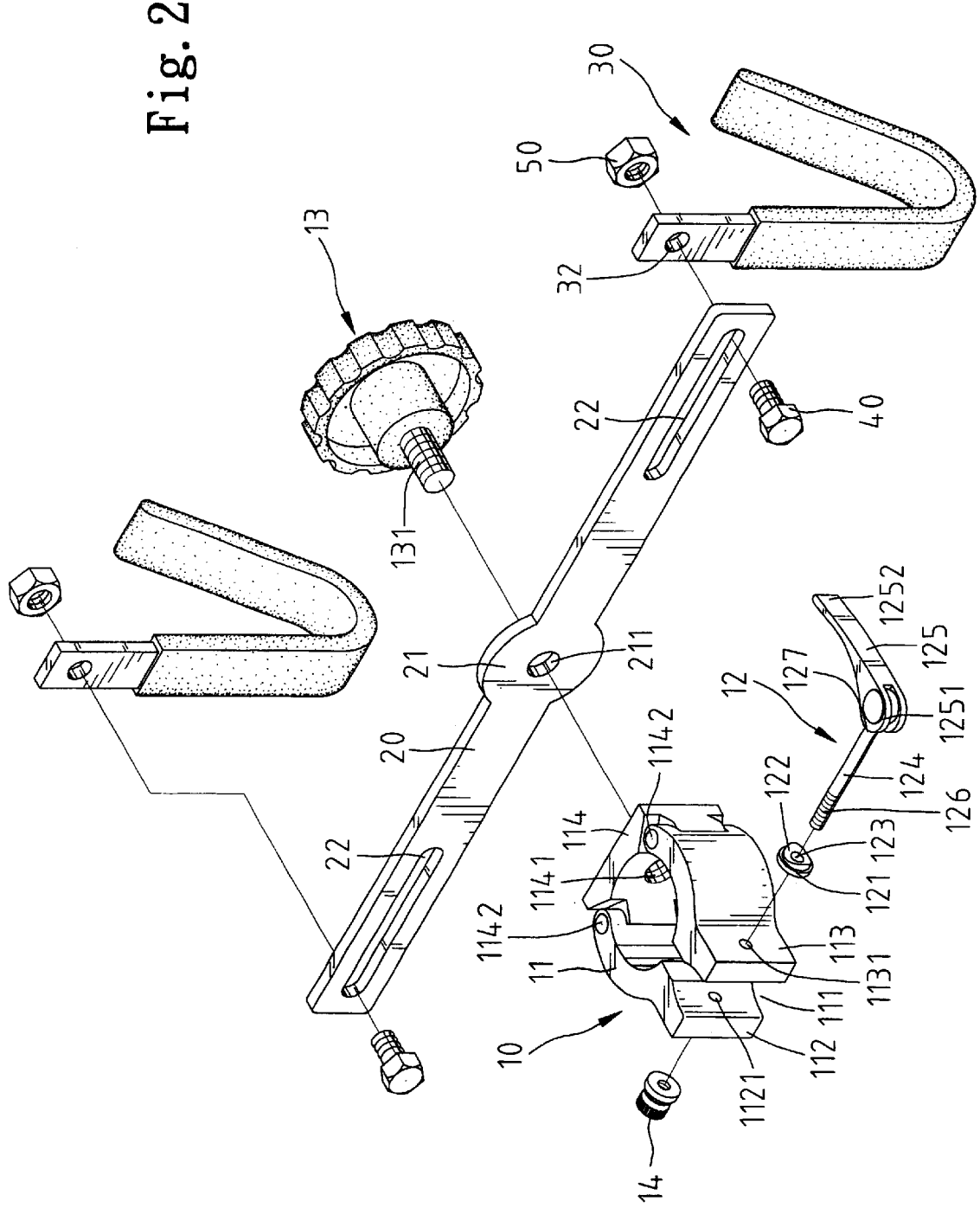
FIG. 2 is an exploded perspective view of the first embodiment of the hanger device in accordance with the present invention.

Referring to FIGS. 1 and 2, a first embodiment of a hanger assembly in accordance with the present invention generally includes a vertical post 70 (FIG. 4) and a hanger device attached to the vertical post 70. The hanger device comprises a fixing device 10 and a hanger member 20. The fixing device 10 in this embodiment is a quick release assembly that is slidable along the vertical post 70. Thus, the level of the fixing device 10 can be adjusted according to need.

The quick release assembly 10 comprises a C-shape tubular portion including two mutually facing sickle shape members 11 and a connecting member 114. Each sickle-shape member 11 includes a first end 112, 113 and a second end pivotally connected to the connecting member 114 by a rivet 1142. The first ends 112 and 113 of the sickle-shape members 11 form two opposite ends for the tubular portion, the first ends 112 and 113 having a slit 111 therebetween. The quick release assembly 10 further includes a pressing means 12 comprising a rod 124 and a lever 125. The rod 124 is extended through aligned holes 1121 and 1131 in the first ends 112 and 113 of the tubular portion and has a threaded end 126 engaged with a nut 14. The other end 127 of the rod 124 is pivotally engaged with an end 1251 of the lever 125. The user may operate the other end 1252 of the lever to control positions of the first ends 112 and 113. The other end 127 of the rod 124 and the end 1251 of the lever 125 are so configured that the first ends 112 and 113 of the tubular portion are moved toward each other to thereby securely clamp the vertical post 70 when the lever 125 is in a first position (namely, the C-shape tubular portion is securely clamped onto the vertical post 70) and that the first ends 112 and 113 of the tubular portion are away from each other when the lever 125 is in a second position to thereby allow the tubular portion to move along a vertical direction relative to the vertical post 70 (namely, the level of the C-shape tubular portion can be adjusted). A washer 121 may be provided between the end 1251 of the lever 125 and an outer side of the end 113 of the tubular portion. The washer 121 includes a recessed portion 122 and a hole 123 through which the rod 124 extends. It is noted that the angular position of the quick release assembly 10 relative to the vertical post 70 is adjustable when the lever 125 is in its second position.

The hanger member 20 includes an engaging portion 21 with a hole 211. A knob 13 includes a threaded stent 131 that extends through the hole 211 of the hanger member 20 and a screw hole 1141 in the connecting member 114, thereby securely attaching the hanger member 20 to the fixing device 10. Each end of the hanger member 20 includes a slot 22 that extends along a longitudinal direction of the hanger member 20. Two hooks 30 are provided and each includes an end having a hole 32. A bolt 40 is extended through each slot 22 and the hole 32 of an associated hook 30. Thus, each hook 30 is adjustable in a longitudinal position relative to the hanger member 20. In addition, each hook 30 is also adjustable in an angular position relative to the hanger member 20 when either the bolt 40 or the nut 50 is loosened.

Figure 3:
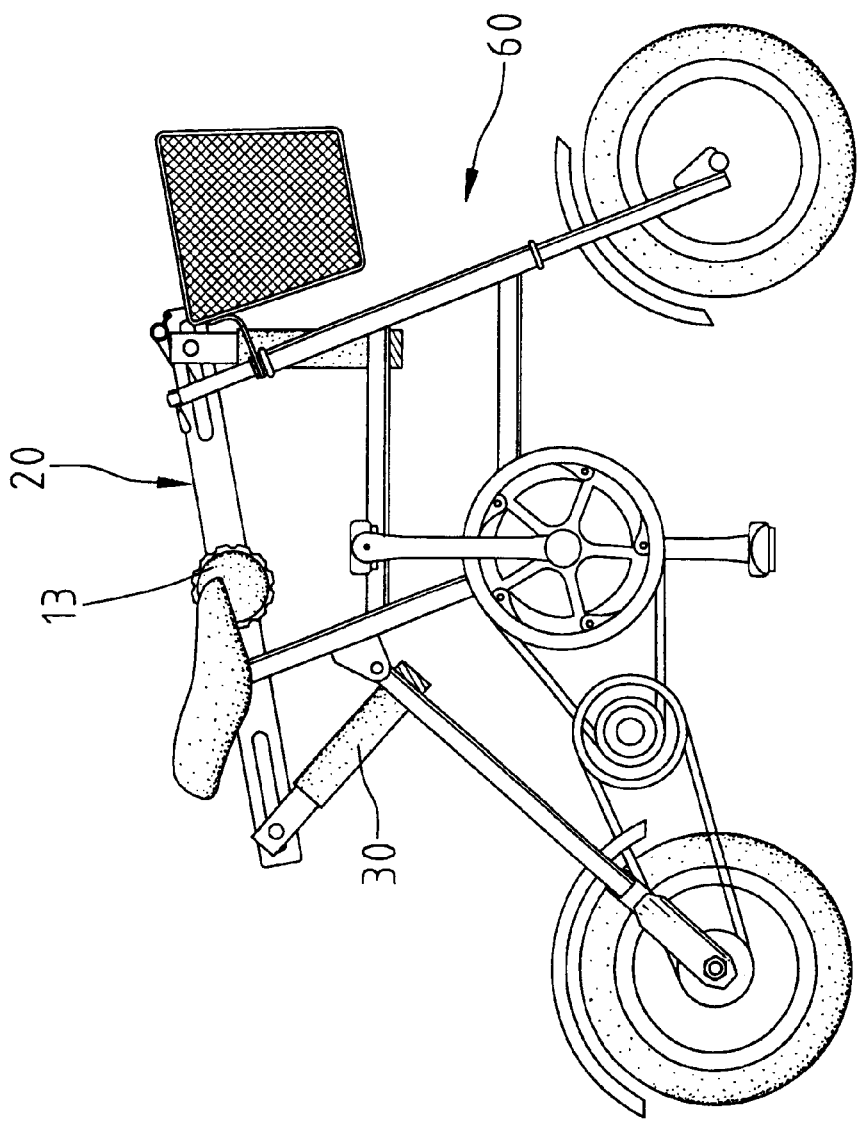
FIG. 3 is a side view illustrating use of the first embodiment of the hanger device on a bicycle.

In use, the hooks 30 are attached to a frame of a bicycle 60, as shown in FIG. 3. The angular positions of the hooks 30 can be adjusted to fit the bicycle frame. It is noted that the quick release assembly 10 (i.e., the fixing device) is mounted around the vertical post 70. The vertical post 70 extends between a floor (not shown) and a ceiling (not shown) to provide a stable support. The vertical post 70 may include a lower tube 74 and an upper tube 72 that is telescopic with respect to the lower tube 74. As illustrated in FIG. 4, two hanger devices are attached to the vertical post 70 at different levels for supporting two bicycles 60 at different levels, thereby saving floor space for storing the bicycles.

Figure 5:
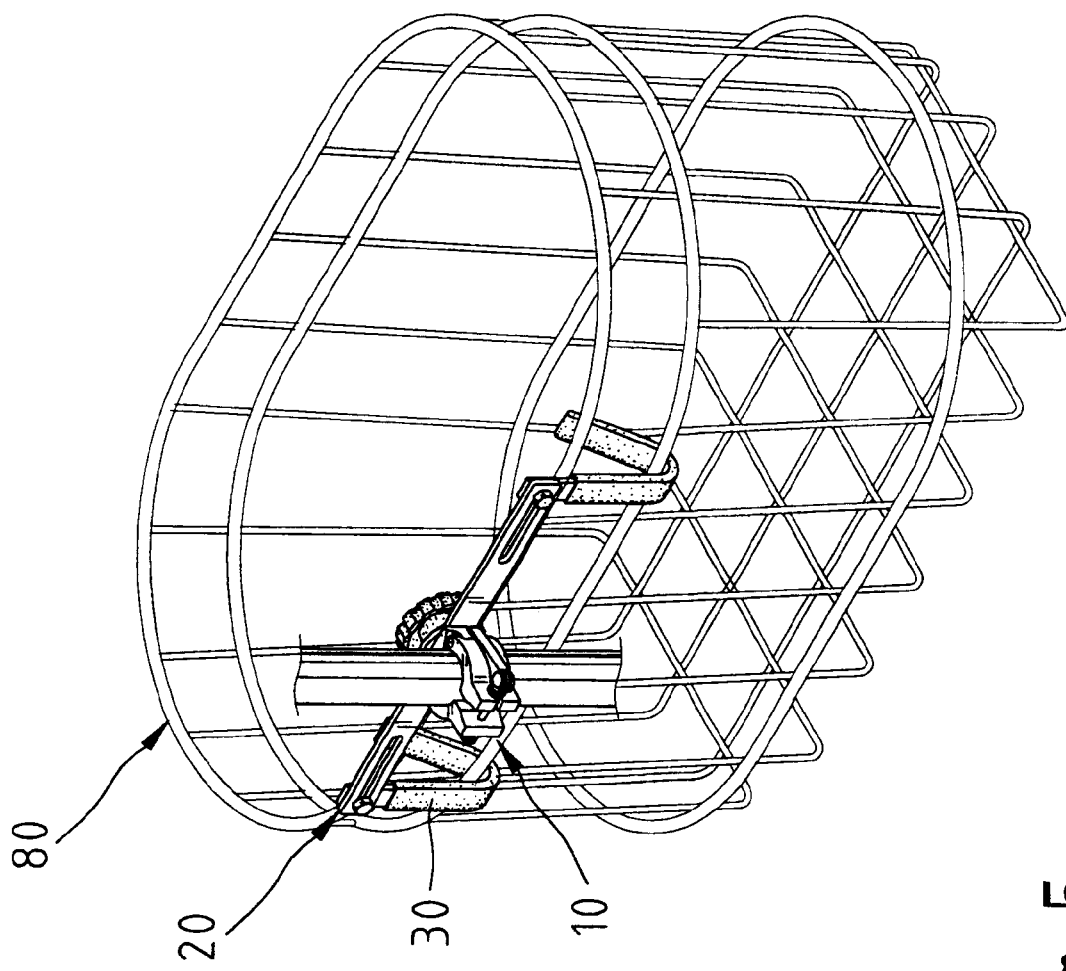
FIG. 5 is a perspective view illustrating use of the first embodiment of the hanger device on a basket.

FIG. 5 illustrates use of the hanger device to a basket for receiving articles. Of course, several hanger devices can be attached to the vertical post 70 for hanging several baskets 80 at different levels. Thus, storage of articles in the basket 80 requires less floor space.

Figure 6:
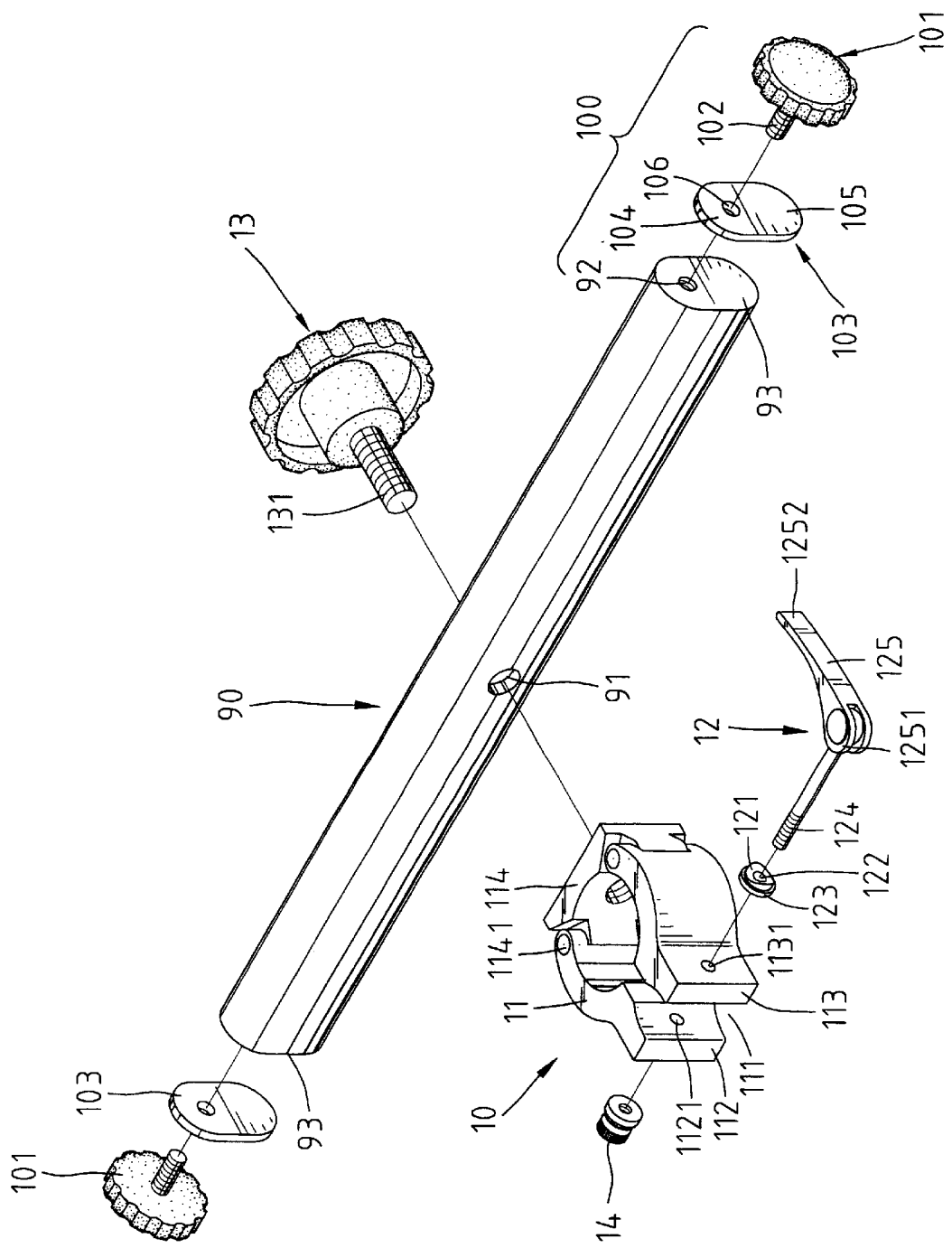
FIG. 6 is an exploded perspective view of a second embodiment of the hanger device in accordance with the present invention.
Figure 7:
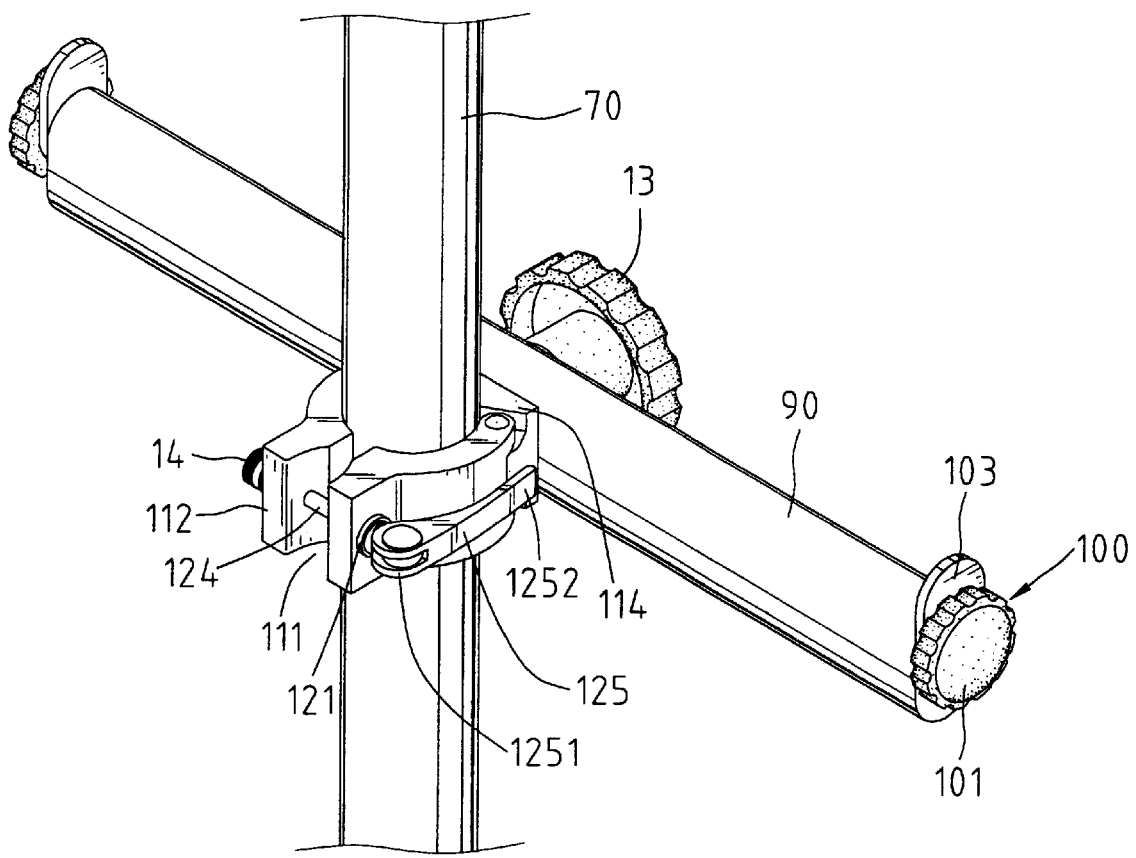
FIG. 7 is a partial perspective view illustrating a second embodiment of a hanger assembly comprising the hanger device in FIG. 6.

FIGS. 6 and 7 illustrates a modified embodiment of the hanger device in accordance with the present invention, wherein the hanger member (now designated by 90) includes a hole 91 through which the threaded stem 131 of the knob 13 extends. Of more importance, an adjustable object abutment 100 is provided on each end of the hanger member 90. Specifically, the hanger member 90 includes two opposite end faces 93 each having a screw hole 92. A stop 103 is attached to each end face 93 and has a hole 106 in an end 104 thereof. Two knobs 101 are provided and each include a threaded stem 102 extending through the hole 106 of an associated stop 103 and the screw hole 92 of an associated end face 93. The angular position of the stop 103 relative to the hanger member 90 is adjustable.

Figure 8:
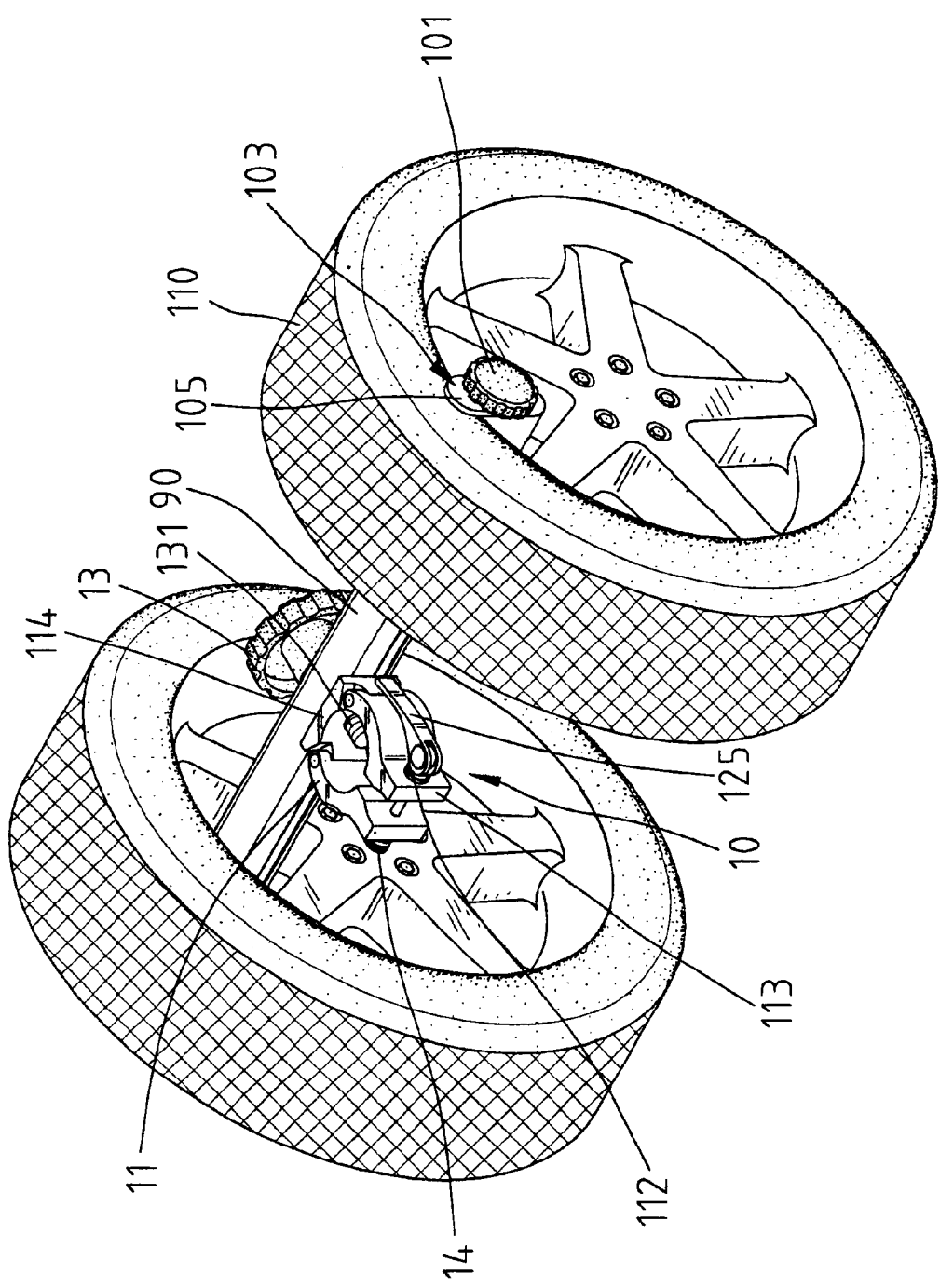
FIG. 8 is a perspective view illustrating use of the second embodiment of the hanger device on two tires.
Figure 9:
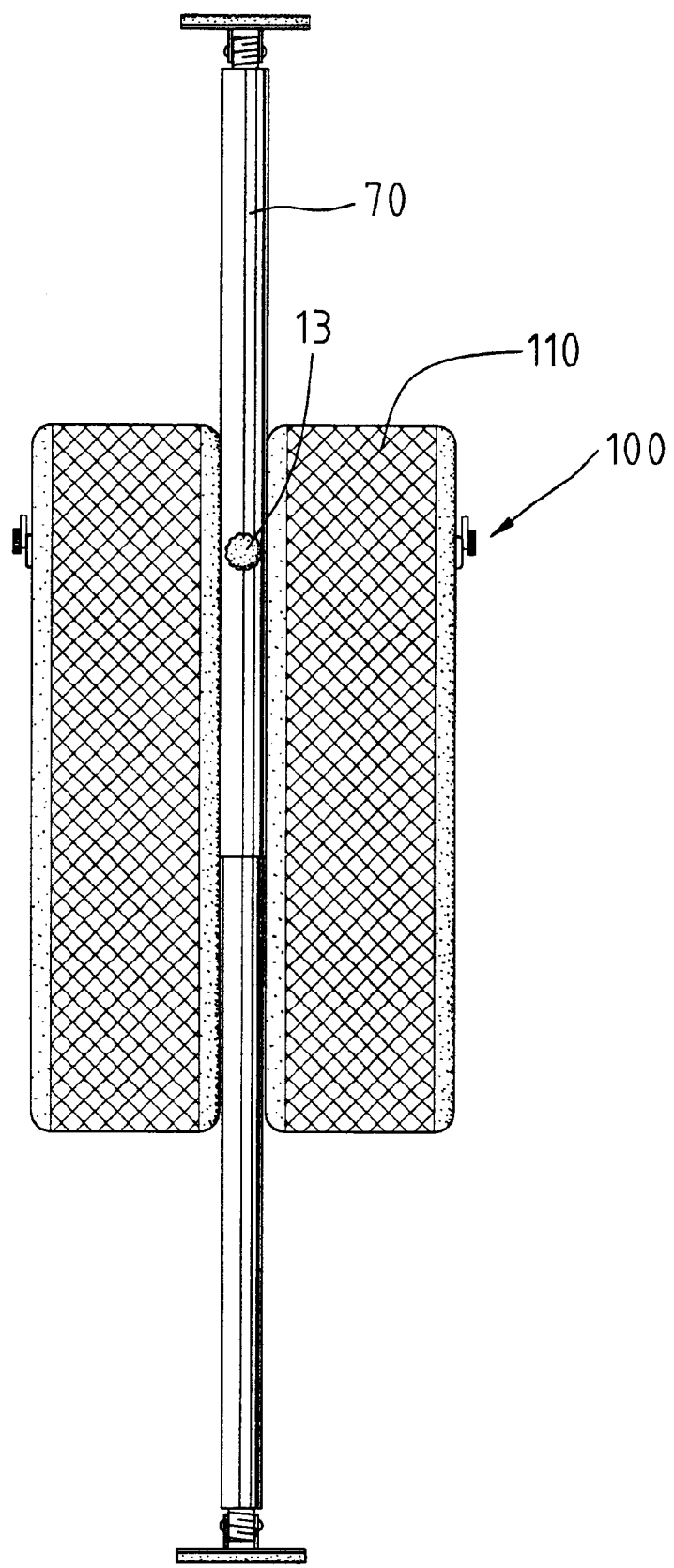
FIG. 9 is a side view illustrating use of the second embodiment of the hanger assembly for supporting tires.

Referring to FIGS. 8 and 9, the second embodiment of the hanger assembly comprising the vertical post 70 and at least one hanger device can be used to hang tires 110. The other end 105 of the stop 103 is used to prevent falling of a respective tire 110. Of course, several hanger devices can be attached to the vertical post 70 for hanging several pairs of tires 110 at different levels. Thus, the problems as a result of piling up of tires are avoided.

Although the invention has been explained in relation to its preferred embodiment, it is to be understood that many other possible modifications and variations can be made without departing from the scope of the invention as hereinafter claimed.

What is claimed is:

1. A hanger device comprising:
   at least a first fixing device securely mounted to a vertical post, the fixing device being slideable along a vertical direction, thereby allowing adjustment in a level of the fixing device relative to the vertical post;
   at least a first hanger member securely attached to the fixing device for supporting at least one object, with the hanger member including two ends each having a slot, wherein each said slot extends along a longitudinal direction of the hanger member;
   two hooks each having an end including a hole;
   a bolt extending through and slidably engaged with each said slot and the hole of an associated said hook; and
   a nut engaging with each said bolt, thereby allowing adjustment of a longitudinal position of each said hook relative to the hanger member.

2. The hanger device as claimed in claim 1, wherein the fixing device is a quick release assembly.

3. The hanger device as claimed in claim 1, wherein the vertical post includes a lower tube and an upper tube that is telescopic with respect to the lower tube.

4. The hanger device as claimed in claim 1, wherein each said hook is adjustable in an angular position relative to the hanger member by rotation of the hook about the bolt.

5. A hanger device comprising:
   a fixing device securely mounted in a vertical post, the fixing device being slidable along a vertical direction, thereby allowing adjustment in a level of the fixing device relative to the vertical post;
   a hanger member securely attached to the fixing device for supporting at least one object, wherein the hanger member includes two opposite end faces each having a screw hole, a stop being attached to each said end face and having a hole; and
   two knobs each including a threaded stem extending through the hole of an associated said stop and the screw hole of an associated said end face.

6. A hanger device comprising:
   a fixing device securely mounted to a vertical post, the fixing device being slidable along a vertical direction, thereby allowing adjustment in a level of the fixing device relative to the vertical post; and a hanger member securely attached to the fixing device for supporting at least one object, wherein the fixing device is a quick release assembly, wherein the quick release assembly includes a C-shape tubular portion through which the vertical post extends, the tubular portion including two opposite ends having a slit therebetween, further comprising a rod extending through the opposite ends of the tubular portion and having a threaded first end and a second end, a nut being engaged with the threaded first end of the rod, a lever including a first end pivotally engaged with the second end of the rod and a second end for manual operation, the second end of the rod and the first end of the lever being so configured that the opposite ends of the tubular portion are moved toward each other to thereby securely clamp the vertical post when the lever is in a first position and that the opposite ends of the tubular portion are away from each other when the lever is in a second position to thereby allow the tubular portion to move along a vertical direction relative to the vertical post.

7. The hanger device as claimed in claim 6, wherein the tubular portion includes two mutually facing sickle-shape members each having a first end and a second end, the first ends of the sickle-shape members forming the opposite ends of the tubular portion, a connecting member being interconnected between the second ends of the sickle-shape members.

8. The hanger device as claimed in claim 7, wherein the second end of each said sickle-shape member is pivotally connected to the connecting member.

9. The hanger device as claimed in claim 7, wherein the connecting member includes a screw hole, the hanger member including a hole, further including a knob with a threaded stem that extends through the hole of the hanger member and the screw hole of the connecting member, thereby engaging the hanger member with the fixing device.

10. The hanger assembly as claimed in claim 1, further comprising:

a second fixing device securely mounted to the vertical post at a different level than the first fixing device, said second fixing device being slidable along a vertical direction, thereby allowing adjustment in the levels of said fixing devices relative to the vertical post; and a second hanger member securely attached to the second fixing device for supporting at least one object.

11. The hanger assembly as claimed in claim 10, wherein each said fixing device is a quick release assembly.

12. The hanger assembly as claimed in claim 10, wherein the vertical post includes a lower tube and an upper tube that is telescopic with respect to the lower tube.

13. The hanger assembly as claimed in claim 10, wherein said second hanger member includes at least one hook attached thereto for hanging said at least one object.

14. The hanger assembly as claimed in claim 10, wherein said second hanger member includes two ends each having a slot, further comprising two hooks each having an end slidably engaged with an associated said slot of the second hanger member.

15. The hanger assembly as claimed in claim 14, wherein each said slot extends along a longitudinal direction of the second hanger member, the end of each said hook including a hole, further including a bolt extending through each said slot and the hole of an associated said hook, and a nut engaging with the bolt, thereby allowing adjustment of a longitudinal position of each said hook relative to the second hanger member.

16. The hanger assembly as claimed in claim 15, wherein each said hook of the second hanger member is adjustable in an angular position relative to said second hanger member.

* * * * *